Dec. 10, 1940.  C. R. BERRY  2,224,285
COTTON PICKER
Original Filed April 23, 1938   3 Sheets-Sheet 1
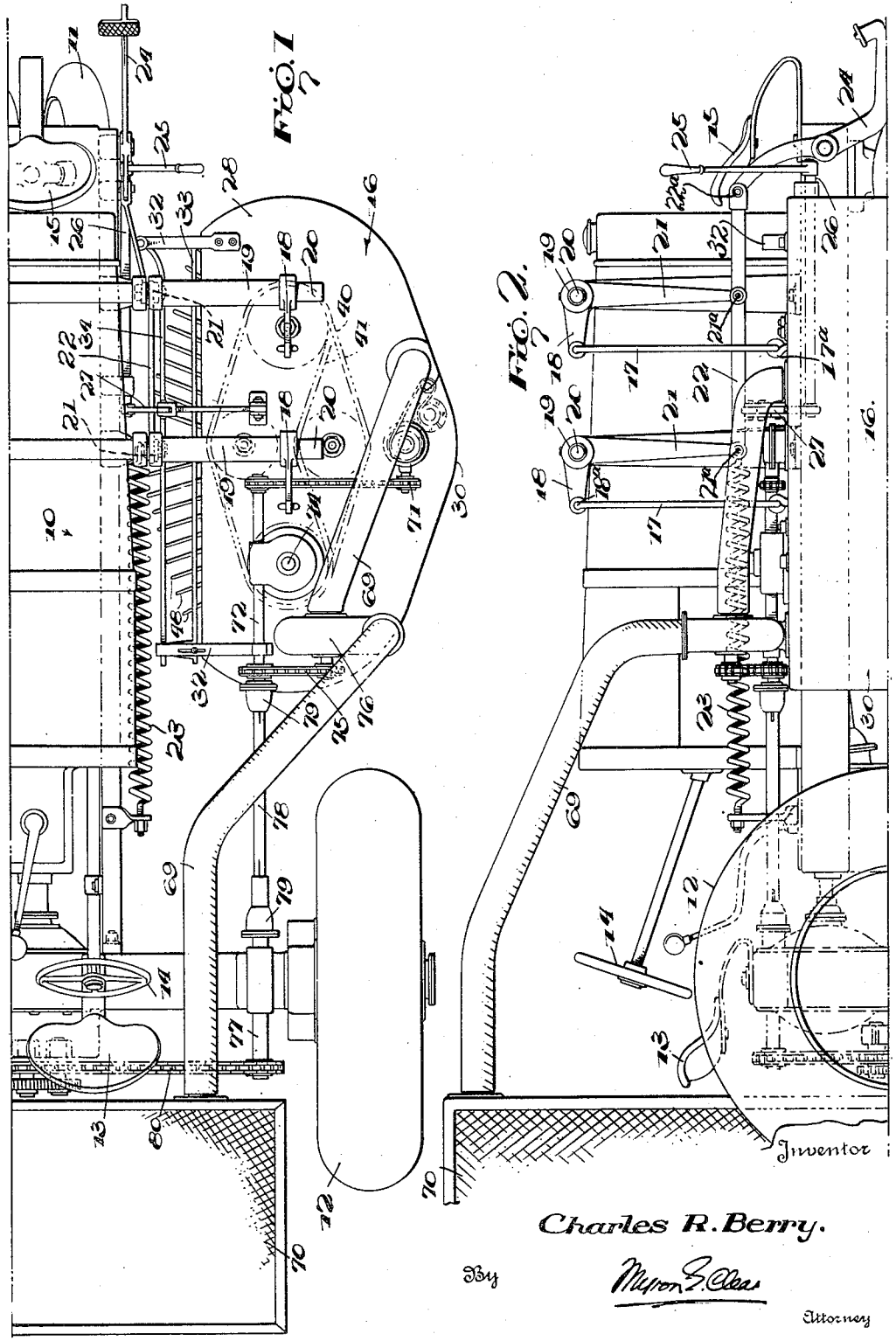
Inventor
Charles R. Berry.
By
Attorney

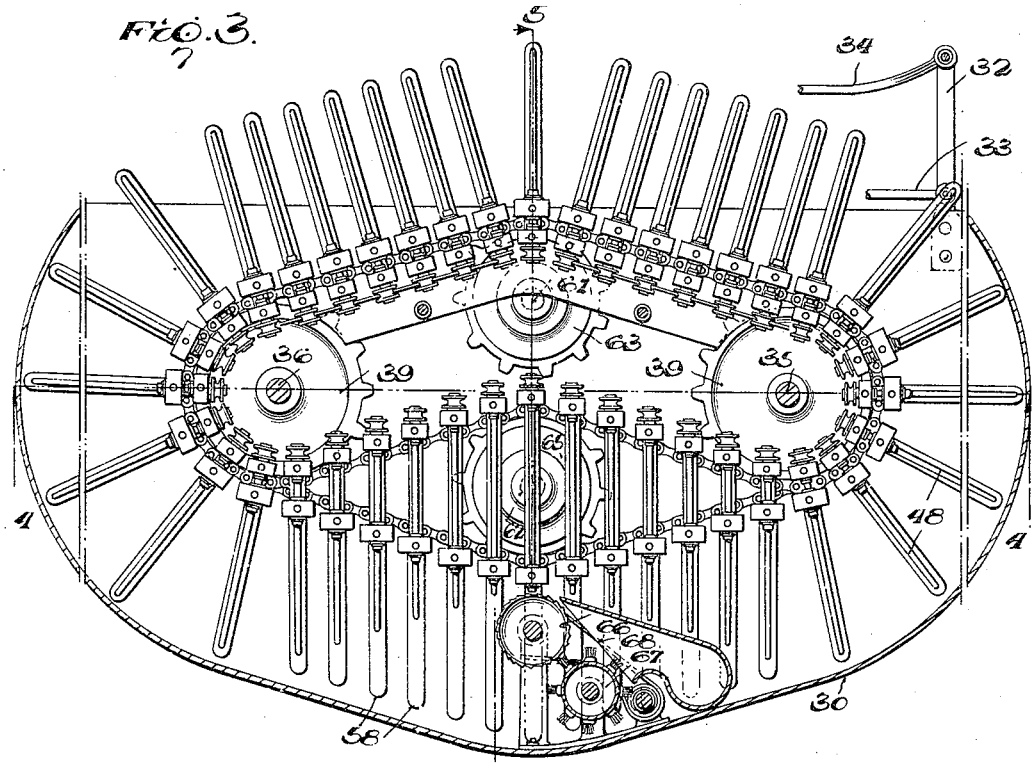
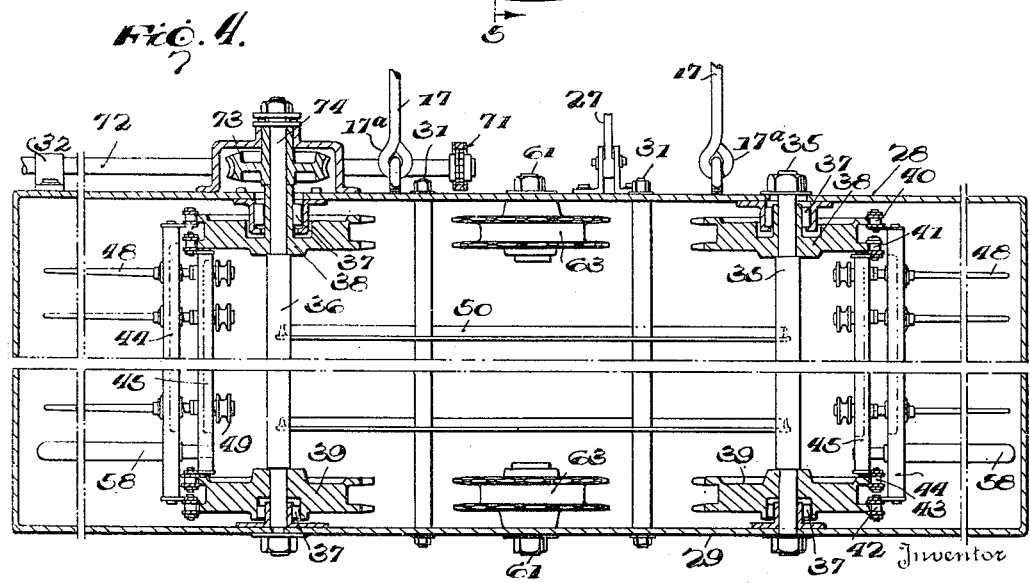

Dec. 10, 1940.  C. R. BERRY  2,224,285
COTTON PICKER
Original Filed April 23, 1938  3 Sheets-Sheet 3
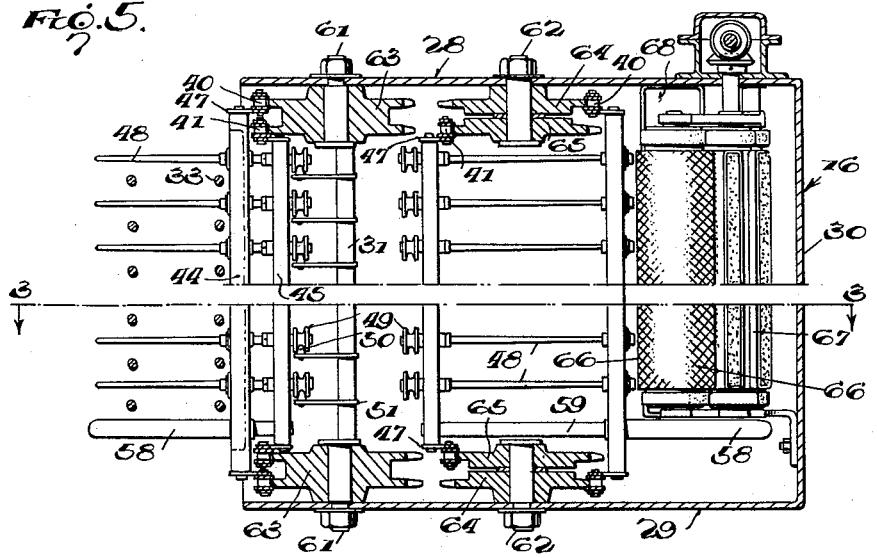
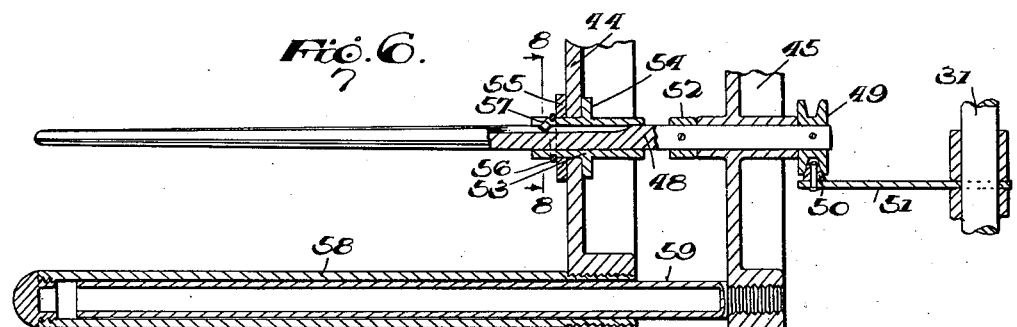
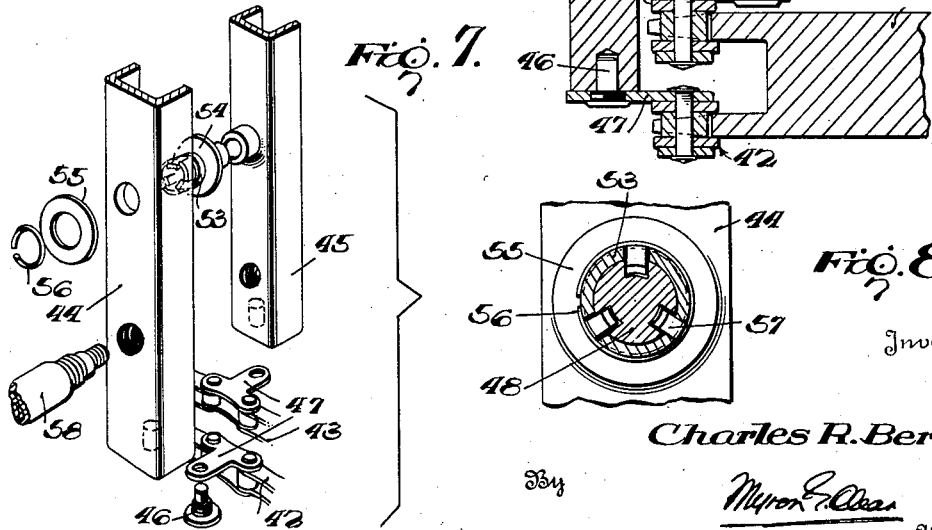
Inventor
Charles R. Berry.
By Myron E. Oser
Attorney Patented Dec. 10, 1940

2,224,285

UNITED STATES PATENT OFFICE 2,224,285

COTTON PICKER

Charles R. Berry, Greenville, Miss., assignor of one-half to Hugh A. Gamble, Greenville, Miss.

Application April 23, 1938, Serial No. 203,903
Renewed July 17, 1939

7 Claims. (Cl. 56—42)

The present invention relates generally to cotton pickers and more particularly to cotton pickers of the type employing one or more picking units having endless series of vertical rows of needles or spindles to operatively contact a row of plants at one side of the unit to remove the cotton therefrom and controlled at the opposite side of the unit in a manner permitting effective discharge of the cotton from the needles or spindles.

More especially the present invention has for its primary object the improvement of that character of picking unit as disclosed and claimed in my copending application filed June 9, 1937, under Serial Number 147,375, wherein two such units are shown in suspended relation at opposite sides of a tractor-carried frame including provision for the ready and efficiently controlled adjustment of the units individually toward and away from the tractor and vertically toward and away from the ground.

In the present instance, the improved picking unit is shown and described as utilized in a machine of the above character although at the outset it is to be understood the contemplated improvements are directed to the picking unit per se and may be utilized in any double row picking machine.

Primarily, the present invention aims to simplify and greatly strengthen the unit as a whole and especially to provide in a more practical and efficient manner for the successful removal of the cotton from the spindles at the outer or doffing side of the unit.

In my above application the spindles, rotating and movable lengthwise through the vertical chain-carried stripper bars, were rotatably held against lengthwise movement in connection with carrier bars having rollers at their upper and lower ends travelling in upper and lower guide channels which governed movement of the carrier bars toward and away from the stripper bars. Thus, in the endless series movement of the parts, the carrier bars simply followed the movement of the stripper bars, due to their connection by the spindles and certain guide fingers extending between these parts.

Moreover at the outer or doffing side of the unit angularly arranged portions of the guide channels resulted in cam-actuated movement of the carrier bars laterally, inwardly away from the stripper bars so that the spindles were retracted endwise inwardly through the stripper bars in order that the previously picked tufts of cotton would be shifted by contact with said stripper bars to the spindle ends at the doffing station.

Among the objects of the present improvements is to eliminate both the cam-actuated movement of the carrier bars toward and away from the stripper bars and all dependance for their series movement upon their spindle and guide finger connections with said stripper bars, and to substitute a positive driving means for the carrier bars in their series movement, said driving means operating in connection with guide means effective to maintain adjacent relation of the carrier bars and stripper bars along the inner or picking side of the unit to position the spindles in effective picking position, and to spread the said bars apart at the outer or doffing side to retract the spindles without straining the latter and with a great reduction in friction and a consequent great increase in strength and durability of the parts.

With this general outline, other objects of a more specific nature, as well as the resulting advantages thereof will clearly appear in the course of the following description in detail, reference being made to the accompanying drawings, forming a part of this specification, and in which, Figure 1 is a partial top plan view illustrating the practical application of the present improved picking unit.

Figure 2 is a partial side elevation thereof.

Figure 3 is a horizontal sectional view through the improved picking unit, taken substantially on line 3—3 of Figure 5.

Figure 4 is a vertical sectional view taken longitudinally and centrally therethrough substantially on line 4—4 of Figure 3.

Figure 5 is a vertical transverse sectional view therethrough taken substantially on line 5—5 of Figure 3.

Figure 6 is an enlarged fragmentary detail sectional view showing the lower portions of one stripper bar and its companion carrier bar, with certain adjacent parts.

Figure 7 is an exploded detail perspective view of certain of the parts of Figure 6, and, Figure 8 is an enlarged detail section taken substantially on line 8—8 of Figure 6.

Referring now particularly to Figures 1 and 2, and as in my previous application above referred to, the tractor 10 is so equipped that the picking units suspended at its sides, of which but a single unit is shown, may be raised and lowered from and toward the ground, and shifted horizontally toward and away from the tractor. With this in mind the tractor is shown as provided with front stearing wheels 11, and rear traction wheels 12, as well as a rear seat 13, for the tractor operator adjacent the steering wheel 14, and a front seat 15, for a second operator who controls the picking unit adjustment.

Without going unnecessarily into details which have already been made parts of my previous application, each picking unit 16, as plainly seen in Figure 2, preferably has a linked or other movable connection 17ª to the lower ends of upright supporting rods 17, similarly connected at their upper ends as at 18ª to the outer cranks 18, of tubular members 19, sleeved on cylindrical supporting bars 20, rigidly outstanding from the tractor 10.

At their inner ends, members 19 have depending cranks 21, pivoted at 21ª to a longitudinal connecting bar 22, controlled by a spring 23, at its rear end and pivoted at its forward end at 22ª to a foot lever 24, adjacent to the front seat 15. Also near seat 15, is a hand lever 25, secured to the forward end of a rock shaft 26, having at its rear end crank and rod connections 27, with the unit 16. Unit 16 may thus be raised and lowered under control of the foot lever 24, and may be adjusted toward and away from the tractor under control of the hand lever 25.

According to the present invention the picking unit 16, as best seen in Figures 3, 4 and 5, has a top plate 28, and a bottom plate 29, connected along the outer side and ends by a vertical wall 30, and rigidly spaced at certain intermediate points by vertical stay bolts 31. Brackets 32, at the front and rear extend laterally from the inner side of the unit for the support of spaced apart vertical series of longitudinal guide rails 33 and 34, forming between them a plant guide channel wider at its forward end by reason of the flaring forward ends of these rails.

The unit also has front and rear vertical shafts 35, and 36, revolubly mounted at the upper and lower ends thereof in bearings 37, in the top and bottom plates 28 and 29, each of these shafts having upper and lower double sprockets 38, and 39, receiving the forward and rear turns of endless chains 40, 41, 42 and 43. To the chains 40, and 42 are turnably connected the upper and lower ends of the series of spaced apart vertical stripper bars 44, and to the chains 41, and 43 are similarly connected the upper and lower ends of the carrier bars 45, one of the latter being positioned inwardly beyond each of the former. These connections of the bars are effected by screw bolts 46, through special apertured links 47, of the several chains as seen in the detail Figure 7.

Through the carrier bars 45, are rotatably journalled the inner ends of the spindles 48, as seen in Figure 6, the inner extremities of which spindles have friction rollers 49, secured thereto and provided with V-shaped grooves to frictionally engage V-shaped driving ribs 50, supported along the inner picking side of the unit by supporting rails 51, in turn connected to, and supported by, the vertical stay bolts 31, before mentioned.

Each spindle 48, is rotatably confined against longitudinal movement in respect to its carrier bar 45, by reason of the friction wheel 49, at one side of the bar, and a fixed collar 52, at the opposite side, and each spindle extends through an opening in the respective stripper bar and through a tubular bushing 53, rotatable in said opening. The inner end of the bushing 53, has an annular flange 54, against the inner surface of the bar, and a washer 55, at the outer face of the bar held by a spring clamping ring 56. Moreover the outer end of the bushing is longitudinally split to provide circumferentially spaced, inwardly deflected tongues 57, which extend into the longitudinal surface grooves of the spindle 48, to act not only as cleanout scrapers each time the spindles are drawn inwardly through the bushing, but also to contact the bases of said grooves and thus support the spindle surfaces against frictional contact with the internal surface of the bushing 53, as most plainly seen in Figure 8.

At their upper and lower ends the several stripper bars 44, have rigid outstanding guide fingers 58, of hollow cylindrical form, and as in my application above referred to, the corresponding carrier bars 45, have outstanding plungers 59, slidably interfitting the hollow fingers 58, and also of hollow form to provide for the housing of controlling springs 60.

Centrally between the forward and rear sprocket shafts 35 and 36, and laterally spaced at equidistantly opposite sides of a line connecting said shafts, are upper and lower vertically alined stub shafts 61, and 62, the two shafts 61 at the inner side of the unit revolubly supporting double sprocket wheels 63, over which the sprocket chains 40, 41, 42 and 43 are trained, said wheels acting merely as idle guides holding all chains outwardly at the inner central portions thereof in the course of movement of the spindles into, rearwardly along, and out of, the picking channels.

The shafts 62 at the outer side of the unit are each provided with a pair of sprocket wheels 64, and 65, the chains 40 and 42, supporting the stripper bars 44, being trained over the outer perimeters of sprocket wheels 64, and the chains 41, and 43, supporting the carrier bars 45, being trained over the inner perimeters of sprocket wheels 65, it being observed that the several sprocket wheels are so related that the axes of sprocket wheels 64 and 65, are in a line connecting the outer perimeters of the front and rear double sprockets, and rotate idly in their guiding functions in relatively opposite directions.

Obviously then, the cotton laden spindles, after having passed rearwardly throughout the plant guiding channel and rounded the rear end of the unit will, in the course of their movement along the outer side of the unit, gradually shift lengthwise with respect to the stripper bars by reason of the gradual separation laterally of the carrier and stripper bars, the former deflecting inwardly with the chains 41 and 43, and the latter deflecting outwardly with the chains 40 and 42. This movement of the parts maintains until, at a point outwardly of, and laterally opposite to, the sprocket wheels 64 and 65, the spindles will be nearly completely withdrawn through the stripper bars and the cotton thereon pushed by said bars to the spindles extremities from which it is readily removable by the doffing mechanism.

The doffing mechanism may be seen generally in Figures 3 and 5, and may, as in my previous application, consist of a card cylinder 66, taking the cotton from the spindles and a brush cylinder 67, brushing the cotton from the card cylinder into a suction receiving mouth 68, from which a pneumatic tube 69, conveys the cotton to a suitable storage compartment 70, at the rear of the tractor for periodic dumping.

The doffing mechanism is driven by sprocket and chain connections 71, as seen in Figure 1, from a shaft 72, journalled on top of the unit, which shaft 72, has a worm and wormwheel connection at 73, with the upstanding end 74, of shaft 36, for driving the endless chains carrying the spindle supports, and also has a sprocket and chain connection 75, with a blower 76, in the pneumatic cotton conveyor tube 69. The shaft 72, is in turn in connection with a shaft 77, through a shaft 78, these shafts being united by means of universal joints 79. Shaft 77, journalled on the axle of the rear wheels 12, is actuated through gearing 80, from the rear portion of the main shaft of the tractor 10, or a part or parts in effective driven relation thereto, all as best seen in Figure 1.

Thus from the foregoing, and bearing in mind that the present improvements are directed to the picking unit and therefore may be utilized with various tractor carried and driven connections other than those here disclosed by way of example only, it is obvious that by separately supporting the two series of carrier and stripper bars and causing the same to spread apart at the doffing station by means guiding and rotating with said supports, I am able to do away with considerable friction existing in the arrangements for this same purpose as disclosed in my prior application. Furthermore I am able in the same proportion to strengthen the parts and render the same more durable and effective in practise.

What I claim is,

1. In a cotton picking unit including endless series of stripper bars and carrier bars and vertical rows of spindles having rotatable supports in connection with the carrier bars preventing relative lengthwise movement of the spindles, and having lengthwise and rotative movements relative to, and through, the stripper bars, endless chains separately supporting said carrier and stripper bars for travel adjacent to, and parallel with, one another during the picking operation along one side of the unit, and means acting in conjunction with said chains for shifting both the carrier and stripper bars relatively to and from one another at the other or cotton discharging side of the unit.

2. In a cotton picking unit of the type set forth employing endless series of vertical rows of spindles, carrier bars in which said spindles are rotatably supported against endwise movement, and stripper bars outwardly of, and companion to, said carrier bars having bearings therethrough in which the spindles are rotatable and endwise movable, separate endless chains supporting and moving said carrier and stripper bars in independent series, means including sprocket shafts spaced longitudinally of the unit for supporting and moving said chains in unison, and means intermediate said shafts at one side of the unit for shifting both of said chains laterally relative to one another and thus moving the carrier and stripper bars toward and from one another to bring about endwise movement of the spindles relative to the stripper bars.

3. In a cotton picking unit of the type set forth employing endless series of vertical rows of spindles, and endless series of vertically disposed carrier and stripper bars, the former being within the latter and rotatably supporting the inner ends of the spindles against endwise movement, the stripper bars having bearings through which the spindles are rotatable and endwise movable, endless chains independently supporting said carrier and stripper bars for movement with, and relative to, one another, means spaced apart longitudinally of the unit for supporting and driving the chains, and means at one side of the unit intermediate said supporting and driving means for engaging and guiding both chains toward and away from one another to cause endwise movement of the spindles relative to the stripper bars.

4. In a cotton picking unit of the type set forth comprising endless series of vertical rows of spindles, and endless series of vertically disposed carrier and stripper bars, the former being within the latter and rotatably supporting the inner ends of the spindles against endwise movement, the stripper bars having bearings through which the spindles are rotatable and endwise movable, endless chains independently supporting said carrier and stripper bars for movement with, and relative to, one another, means spaced apart longitudinally of the unit for supporting and driving the chains, and means at one side of the unit intermediate said supporting and driving means for engaging and guiding both chains toward and away from one another to cause endwise movement of the spindles relative to the stripper bars, said last named means comprising independent and oppositely rotatable idler sprockets, the stripper bar chains being trained around the outer perimeters of certain of said sprockets, and the carrier bar chains being trained around the inner perimeters of the other sprockets.

5. In a cotton picking unit employing an endless arrangement of vertical rows of spindles, and endless series of vertically disposed outer stripper bars and inner carrier bars, in the latter of which the spindles are rotatably held against endwise movement and in the former of which the spindles have both rotatable and endwise movement, pairs of upper and lower endless chains to which the upper and lower ends of said bars are connected, the chains of each pair being independently joined to their respective series of bars, sprocket shafts spaced apart longitudinally of the unit for supporting and driving said chains in the same direction, and means at one side of the unit individually engaging the chains at a point intermediate said sprocket shafts for shifting both chains of each pair laterally relative to one another and thereby similarly shifting the carrier and stripper bars to bring about endwise movement of the spindles, relative to the stripper bars.

6. The invention set forth in claim 5, in which the chain shifting means consists of upper and lower pairs of idle guiding sprockets, the sprockets of each pair being rotatable in relatively opposite directions and engaging relatively opposite sides of the carrier and stripper bar chains.

7. The invention set forth in claim 5, in which the chain shifting means consists of upper and lower pairs of coaxial, independently rotatable guiding sprockets, the carrier bar chains being trained around the inner perimeters of certain of said sprockets and the stripper bar chains being trained around the outer perimeters of the other sprockets.

CHARLES R. BERRY.